(12) United States Patent
Cadman (10) Patent No.: US 11,241,955 B2
(45) Date of Patent: Feb. 8, 2022

(54) VEHICLE CONTROL METHOD AND APPARATUS

(71) Applicant: JAGUAR LAND ROVER LIMITED, Coventry (GB)

(72) Inventor: Stuart Cadman, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 16/971,855

(22) PCT Filed: Feb. 25, 2019

(86) PCT No.: PCT/EP2019/054517
§ 371 (c)(1),
(2) Date: Aug. 21, 2020

(87) PCT Pub. No.: WO2019/162482
PCT Pub. Date: Aug. 29, 2019

(65) Prior Publication Data
US 2021/0008978 A1 Jan. 14, 2021

(30) Foreign Application Priority Data
Feb. 26, 2018 (GB) ..................................... 1803043

(51) Int. Cl.
*B60K 23/08* (2006.01)
*B60W 10/119* (2012.01)
(Continued)

(52) U.S. Cl.
CPC ....... *B60K 23/0808* (2013.01); *B60W 10/119* (2013.01); *B60W 10/14* (2013.01);
(Continued)

(58) Field of Classification Search
CPC . B60K 23/0808; B60W 10/119; B60W 10/14; B60W 30/02; B60W 2552/40;
(Continued)

(56) References Cited

U.S. PATENT DOCUMENTS

| 4,846,298 | A | 7/1989 | Naito |
| 7,337,053 | B2 * | 2/2008 | Piyabongkarn ....... B60W 10/16 701/70 |

(Continued)

FOREIGN PATENT DOCUMENTS

| DE | 102008032763 A1 | 2/2009 |
| EP | 1203687 A1 | 5/2002 |

(Continued)

OTHER PUBLICATIONS

International Search Report and Written Opinion, PCT/EP2019/054517, dated Jun. 17, 2019.

(Continued)

*Primary Examiner* — Tinh Dang
(74) *Attorney, Agent, or Firm* — McCoy Russell LLP (57) ABSTRACT

The present disclosure relates to a powertrain controller (3) for controlling a torque distribution between a front axle (4) and a rear axle (5) of a vehicle (1). The powertrain controller (3) includes a processor (8) and a memory device (9). The processor (8) is configured selectively to implement first and second torque distribution profiles (TDP1, TDP2) defining the torque distribution between the front axle (4) and the rear axle (5). The processor (8) determines when one or more vehicle dynamics parameter (VDPn) is within one or more predefined stability margin (VSMn) and when the one or more vehicle dynamics parameter (VDPn) is outside the one or more predefined stability margin (VSMn). A torque request signal (STQR) is monitored to identify a change in a torque request (TQR). The first torque distribution profile (Continued)

(TDP1) is implemented when the one or more vehicle dynamics parameter (VDPn) is within the one or more predefined stability margin (VSMn). The second torque distribution profile (TDP2) is implemented when the one or more vehicle dynamics parameter (VDPn) is outside the one or more predefined stability margin (VSMn) and the identified change in the torque request (TQR) comprises a decrease in the torque request (TQR). The present disclosure also relates to a vehicle including a powertrain controller (3); a method of controlling a torque distribution between the front and rear axles (4, 5) of a vehicle (1); and a non-transitory computer-readable medium.

18 Claims, 5 Drawing Sheets

(51) Int. Cl.
    *B60W 10/14*     (2012.01)
    *B60W 30/02*     (2012.01)
    *B60W 10/16*     (2012.01)

(52) U.S. Cl.
    CPC ....... *B60W 30/02* (2013.01); *B60W 2520/105* (2013.01); *B60W 2520/125* (2013.01); *B60W 2540/10* (2013.01); *B60W 2540/12* (2013.01); *B60W 2552/40* (2020.02); *B60W 2720/403* (2013.01)

(58) Field of Classification Search
    CPC ..... B60W 2520/105; B60W 2520/125; B60W 2540/10; B60W 2540/12; B60W 2720/403; B60W 10/16

See application file for complete search history.

(56) References Cited

U.S. PATENT DOCUMENTS

| | | | |
|---|---|---|---|
| 7,493,982 B2 * | 2/2009 | Kurosawa | B60K 17/3462 |
| | | | 180/247 |
| 7,949,456 B2 * | 5/2011 | Miura | B60W 10/04 |
| | | | 701/72 |
| 8,504,238 B2 * | 8/2013 | Yu | B60W 30/045 |
| | | | 701/29.2 |
| 10,029,566 B2 * | 7/2018 | Chimner | B60K 23/04 |
| 2003/0163237 A1 * | 8/2003 | Kim | B60T 8/1769 |
| | | | 701/70 |
| 2011/0257826 A1 | 10/2011 | Yu et al. | |
| 2016/0229290 A1 * | 8/2016 | Chimner | B60K 23/0808 |

FOREIGN PATENT DOCUMENTS

| | | |
|---|---|---|
| EP | 2106952 A1 | 10/2009 |
| GB | 2414217 A | 11/2005 |
| WO | 2005/073010 A1 | 8/2005 |

OTHER PUBLICATIONS

Combined Search and Examination Report, GB1803043.7, dated Aug. 15, 2018.

* cited by examiner

VEHICLE CONTROL METHOD AND APPARATUS

CROSS-REFERENCE TO RELATED APPLICATIONS

This application is a 371 of International Application No. PCT/EP2019/054517, filed Feb. 25, 2019, which claims priority to GB Patent Application 1803043.7, filed Feb. 26, 2018, the contents of both of which are incorporated by reference herein in their entirety.

TECHNICAL FIELD

The present disclosure relates to a vehicle control method and apparatus. More particularly, but not exclusively, the present disclosure relates to a powertrain controller for controlling a torque distribution between a front axle and a rear axle of a vehicle. The present disclosure also relates to a method of controlling a torque distribution between a front axle and a rear axle of a vehicle.

Aspects of the invention relate to a powertrain controller, a vehicle, a method, and a non-transitory computer-readable medium.

BACKGROUND

It has been recognised that the appropriate powertrain-torque distribution between the front and rear axles is dependent, at least partially, on a surface grip level (represented as a coefficient of friction p (mu)). The vehicle may deviate from an intended course during a turning manoeuvre as a result of a change from a positive torque request to a negative torque request, for example as a result of a lift-off event when the driver lifts off the throttle pedal. This change in the torque request may result in the vehicle oversteering or understeering depending on the powertrain-torque distribution between the front and rear axle; and/or the surface grip level (mu). In order to provide a consistent vehicle response, a stability margin (or stability margins) used to control the torque distribution between the front and rear axles may be defined below a tyre adhesion point. The stability margins may be triggered early to improve vehicle response on high and low surface grip level (mu), thereby reducing the occurrences of torque transfer between the front and rear axles. However, this may reduce the opportunities for energy recuperation and potentially provides a non-optimal torque distribution between the front and rear axles.

The present invention, at least in certain embodiments, seeks to overcome at least some of the problems associated with the prior art systems.

SUMMARY OF THE INVENTION

Aspects and embodiments of the present invention relate to a powertrain controller, a vehicle, a method and a non-transitory computer-readable medium as claimed in the appended claims.

According to an aspect of the present invention there is provided a powertrain controller for controlling a torque distribution between a front axle and a rear axle of a vehicle; the powertrain controller comprising a processor and a memory device, the processor being configured selectively to implement first and second torque distribution profiles defining the torque distribution between the front axle and the rear axle; wherein the processor is configured to:

determine when one or more vehicle dynamics parameter is within one or more predefined stability margin and when the one or more vehicle dynamics parameter is outside the one or more predefined stability margin;

monitor a torque request signal to identify a change in a torque request;

implement the first torque distribution profile when the one or more vehicle dynamics parameter is within the one or more predefined stability margin; and implement the second torque distribution profile when the one or more vehicle dynamics parameter is outside the one or more predefined stability margin and the identified change in the torque request comprises a decrease in the torque request. The decrease in the torque request may, for example, indicate an overrun torque which is generated when a driver of the vehicle lifts off a throttle pedal (also known as an accelerator pedal). The first and second torque distribution profiles control the distribution of a powertrain torque between the front and rear axles (i.e. the torque split between the front and rear axles).

The processor may be configured to implement the second torque distribution profile when the magnitude of the decrease in the torque request is greater than a predefined torque change threshold. The predefined torque change threshold may correspond to a change in the torque request which may affect vehicle stability when the one or more vehicle dynamics parameter is outside the one or more predefined stability margin. The predefined torque change threshold may be calibrated for a vehicle.

Alternatively, or in addition, the processor may be configured to implement the second torque distribution profile when a rate of change of the torque request during the identified change is greater than a predefined rate of change threshold. The predefined rate of change threshold may correspond to a rate of change in the torque request which may affect vehicle stability when the one or more vehicle dynamics parameter is outside the one or more predefined stability margin. The predefined rate of change threshold may be calibrated for a vehicle.

The decrease in the torque request may result in the torque request changing to a negative torque request; or an increase in a magnitude of a negative torque request. The second torque distribution profile may be implemented when the identified change in the torque request results in a negative torque request or an increase in a magnitude of a negative torque request. The processor may be configured to implement the second torque distribution profile when the decrease in the torque request comprises a change from a positive torque request to a negative torque request. Alternatively, or in addition, the processor may be configured to implement the second torque distribution profile when the decrease in the torque request comprises a change from a substantially neutral torque request to a negative torque request. Alternatively, or in addition, the processor may be configured to implement the second torque distribution profile when the decrease in the torque request comprises an increase in a magnitude of a negative torque request.

The first and second torque distribution profiles may be implemented in dependence on a surface grip level. To reduce a tendency for the vehicle to oversteer, the distribution of a negative torque towards the front axle may be prioritised when the vehicle is travelling over a surface providing a high surface grip level. To reduce a tendency for the vehicle to understeer or oversteer, the distribution of a negative torque may be distributed more evenly between the front and rear axles when the vehicle is travelling on a surface providing a low surface grip level. The surface grip level may be assessed in dependence on a lateral acceleration of the vehicle.

The first torque distribution profile may comprise a first fixed torque distribution between the front axle and the rear axle of the vehicle.

The controller may be configured to determine a lateral acceleration of the vehicle. The second torque distribution profile may control the torque distribution between the front axle and the rear axle in dependence on the determined lateral acceleration of the vehicle.

The second torque distribution profile may increase the torque distributed to the front axle in dependence on the determined lateral acceleration of the vehicle. The second torque distribution profile may control the torque distributed to the front axle in direct proportion to the determined lateral acceleration. The second torque distribution profile may control the torque distributed to the rear axle in dependence on the determined lateral acceleration of the vehicle. The second torque distribution profile may decrease the torque distributed to the rear axle in direct proportion to the determined lateral acceleration.

The second torque distribution profile may comprise a lateral acceleration threshold. The control of the torque distribution between the front axle and the rear axle in dependence on the determined lateral acceleration of the vehicle may optionally be implemented when the lateral acceleration of the vehicle is greater than the lateral acceleration threshold.

When the determined lateral acceleration is less than the lateral acceleration threshold, the second torque distribution profile may comprise a second fixed torque distribution between the front axle and the rear axle of the vehicle. The second fixed torque distribution of the second torque distribution profile may distribute more torque to the rear axle of the vehicle than the first fixed torque distribution profile of the first torque distribution profile. The first fixed torque distribution may distribute less torque to the rear axle than the second fixed torque distribution.

The identified change in the torque request may correspond to an overrun torque. The overrun torque may, for example, correspond to a throttle pedal lift-off event.

The identified change in the torque request may correspond to a braking event.

The vehicle dynamics parameters may comprise one or more of the following: the longitudinal acceleration, the lateral acceleration, the vertical acceleration, the rotational movement about the longitudinal axis, the rotational movement about the transverse axis, and the rotational movement about the vertical axis. The vehicle dynamics parameters may comprise one or more of the following: a powertrain torque request, a braking torque request, one or more wheel speed signal, and one or more wheel slip signal.

The powertrain controller may be configured to analyse the vehicle dynamics parameters to generate one or more index. For example, the powertrain controller may be configured to generate one or more of the following: an overbraking index; a dynamic traction control stability index; and a yaw stability index. Each index may be generated for an axle of the vehicle. Thus, separate indices may be generated for the front and rear axles of the vehicle. The one or more index may be used to determine if the one or more vehicle dynamics parameter are within the one or more predefined stability margin. Each index may indicate a stable condition or an unstable condition. If one or more index indicate an unstable condition, the powertrain controller may determine that the one or more vehicle dynamics parameter is outside the one or more predefined stability margin. If each index indicates a stable condition, the powertrain controller may determine that the one or more vehicle dynamics parameter is within the one or more predefined stability margin.

According to a further aspect of the present invention there is provided a vehicle comprising a powertrain controller as described herein. The vehicle may comprise one or more electric traction motor.

According to a further aspect of the present invention there is provided a method of controlling a torque distribution between a front axle and a rear axle of a vehicle by selectively implementing at least first and second torque distribution profiles, the first and second torque distribution profiles defining the torque distribution between the front axle and the rear axle; wherein the method comprises:

determining when one or more vehicle dynamics parameter is within one or more predefined stability margin and when the one or more vehicle dynamics parameter is outside the one or more predefined stability margin;

monitoring a torque request to identify a change in the torque request;

implement the first torque distribution profile when the one or more vehicle dynamics parameter is within the one or more predefined stability margin; and implement the second torque distribution profile when the one or more vehicle dynamics parameter is outside the one or more predefined stability margin and the identified change in the torque request comprises a decrease in the torque request.

The second torque distribution profile may be implemented when the magnitude of the decrease in the torque request is greater than a predefined torque change threshold.

Alternatively, or in addition, the second torque distribution profile may be implemented when a rate of change of the torque request during the identified change is greater than a predefined rate of change threshold.

The method may comprise implementing the second torque distribution profile when the decrease in the torque request comprises a change from a positive torque request to a negative torque request; or when the decrease in the torque request comprises a change from a substantially neutral torque request to the negative torque request; or when the decrease in the torque request comprises an increase in a magnitude of a negative torque request.

The method may comprise determining a lateral acceleration of the vehicle. The second torque distribution profile may control the torque distribution between the front axle and the rear axle in dependence on the determined lateral acceleration of the vehicle. The second torque distribution profile may increase the torque distributed to the front axle in dependence on the determined lateral acceleration of the vehicle. The second torque distribution profile may control the torque distributed to the front axle in direct proportion to the determined lateral acceleration. The second torque distribution profile may control the torque distributed to the rear axle in dependence on the determined lateral acceleration of the vehicle. The second torque distribution profile may decrease the torque distributed to the rear axle in direct proportion to the determined lateral acceleration.

The second torque distribution profile may comprise a lateral acceleration threshold. The control of the torque distribution between the front axle and the rear axle in dependence on the determined lateral acceleration of the vehicle may optionally be implemented when the lateral acceleration of the vehicle is greater than the lateral acceleration threshold.

The first torque distribution profile may comprise a first fixed torque distribution between the front axle and the rear axle of the vehicle.

When the determined lateral acceleration is less than the lateral acceleration threshold, the second torque distribution profile may comprise a second fixed torque distribution between the front axle and the rear axle of the vehicle. The second fixed torque distribution of the second torque distribution profile may distribute more torque to the rear axle of the vehicle than the first torque distribution profile. The first fixed torque distribution may distribute less torque to the rear axle than the second fixed torque distribution.

The decrease in the torque request may correspond to an overrun torque. The overrun torque may correspond to a throttle pedal lift-off event.

The decrease in the torque request identified by the processor may correspond to a braking event.

According to a further aspect of the present invention there is provided a non-transitory computer-readable medium having a set of instructions stored therein which, when executed, cause a processor to perform the method described herein.

The memory device is electrically coupled to the electronic processor and has instructions stored therein. The processor is configured to access the memory device and execute the instructions stored therein.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a vehicle controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

A vehicle 1 comprising a powertrain (denoted generally by the reference numeral 2) and a powertrain controller 3 in accordance with an embodiment of the present invention will now be described with reference to the accompanying figures. The vehicle 1 is described herein with reference to a reference frame comprising a longitudinal axis X, a transverse axis Y and a vertical axis Z.

Figure 1:
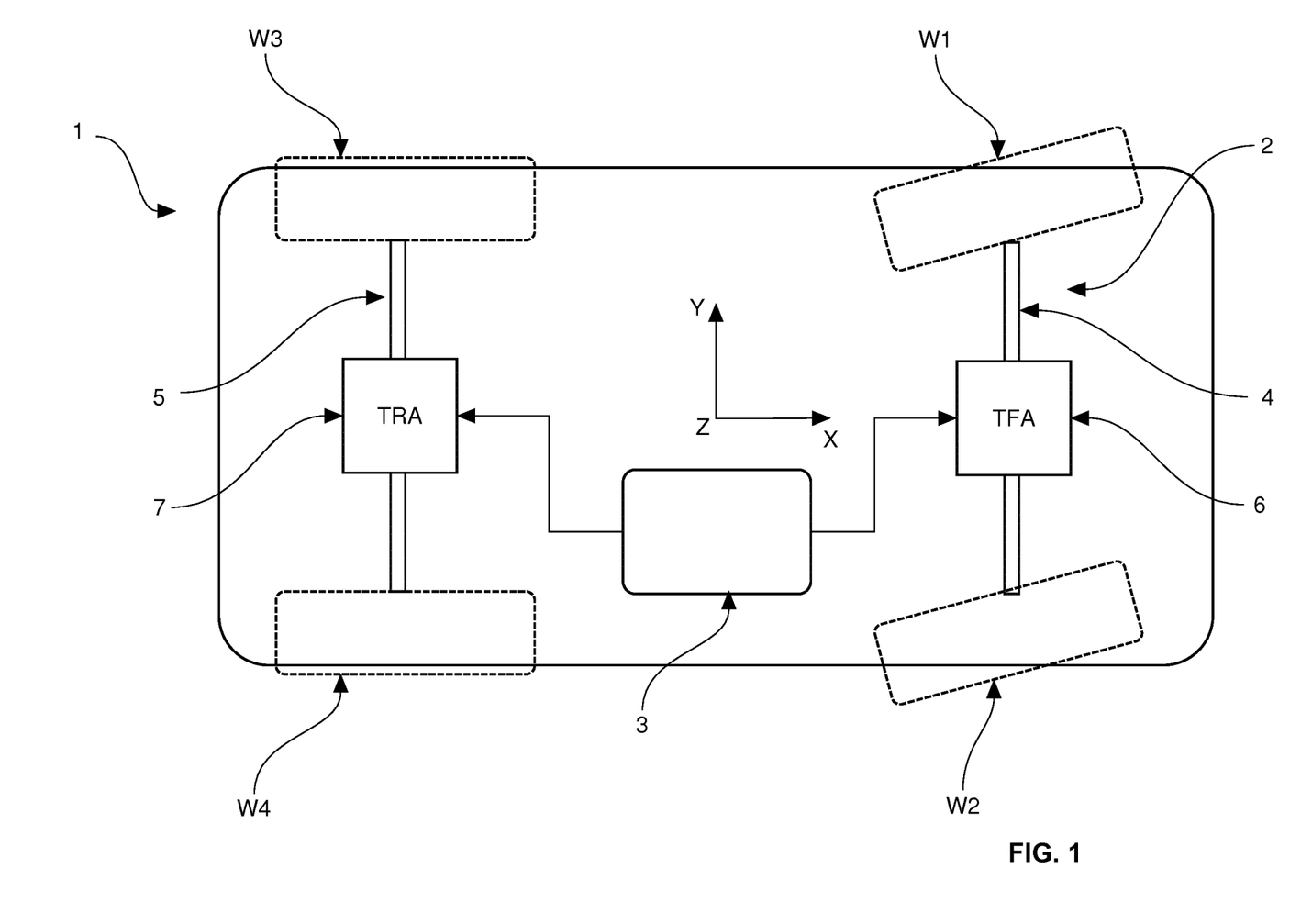
FIG. 1 shows a schematic representation of a vehicle incorporating a powertrain controller in accordance with an embodiment of the present invention.

The vehicle 1 in the present embodiment is a road vehicle, such as an automobile, a sports utility vehicle (SUV) or a utility vehicle. As shown in FIG. 1, the vehicle 1 comprises but is not limited to first and second wheels W1, W2 mounted on a front axle 4; and third and fourth wheels W3, W4 mounted on a rear axle 4. The powertrain 2 comprises but is not limited to first and second electric motors 6, 7 configured to output torque to the front and rear axles 4, 5 respectively. In use, a powertrain torque (also known as a traction torque) is transmitted to each of the wheels W1-4 to propel the vehicle 1. The powertrain controller 3 is configured to control operation of the first and second electric motors 6, 7. The powertrain controller 3 may, for example, control operation of first and second inverters (not shown) associated with the first and second electric motors 6,7 respectively. Other configurations of the powertrain 2 are also useful. For example, the powertrain 2 may comprise of but is not limited to one electric motor and/or an internal combustion engine.

The powertrain controller 3 is operative to control a powertrain-torque distribution to the front and rear axles 4, 5 of the vehicle 1. In particular, the powertrain controller 3 is configured to determine a torque split ratio (Front/Rear) to control the powertrain-torque distribution between the front axle 4 and the rear axle 5 of the vehicle 1. The torque split ratio defines the proportion of a total requested powertrain torque TQR distributed to the front axle 4 (referred to herein as the front axle powertrain torque TFA) and to the rear axle 5 (referred to herein as the rear axle powertrain torque TRA). It will be understood that the sum of the front axle powertrain torque TFA and the rear axle powertrain torque TRA is equal to the total requested powertrain torque TRQ. In the present embodiment the powertrain 2 does not include mechanical means for controlling the powertrain-torque distribution between the front and rear axles 4, 5. Rather, the powertrain controller 3 controls operation of the first and second electric motors 6, 7 to adjust the powertrain-torque distribution between the front and rear axles 4, 5. The powertrain controller 3 comprises but is not limited to a processor 8 connected to a memory device 9. In use, the processor 8 executes a set of computational instructions stored on the memory device 9. The operation of the processor 8 is described in more detail herein.

Figure 2:
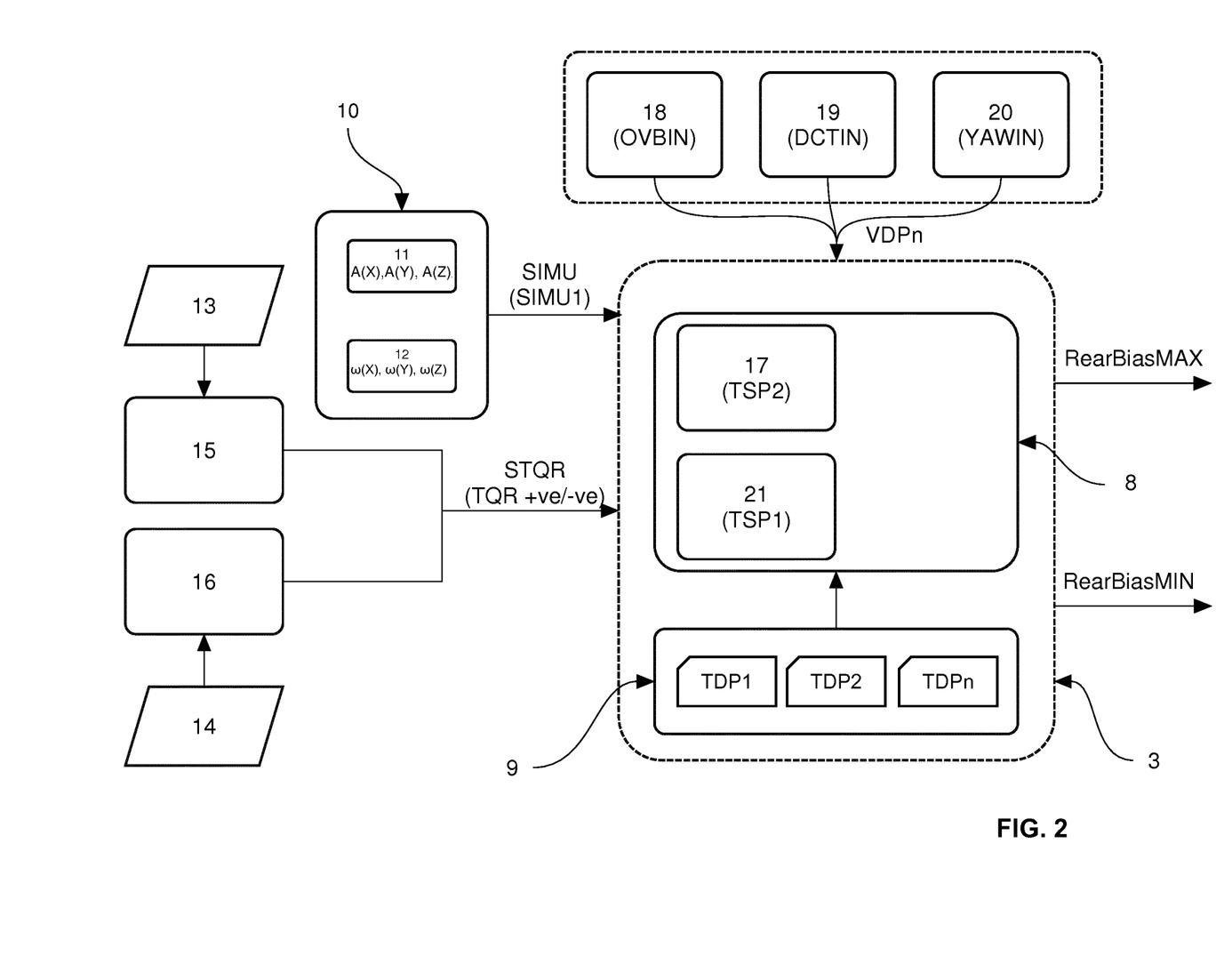
FIG. 2 shows a schematic representation of the powertrain controller shown in FIG. 1.

A schematic representation of the powertrain controller 3 is shown in FIG. 2. The powertrain controller 3 is configured to receive an inertial motion signal SIMU from an inertial measurement unit (IMU) 10 provided in the vehicle 1. The IMU 10 is configured to measure a longitudinal acceleration A(X) along the longitudinal axis X, a lateral acceleration A(Y) along the transverse axis Y and a vertical acceleration A(Z) along the vertical axis Z. The IMU 10 is configured also to measure a rotational movement ω(X) about the longitudinal axis X (referred to as "roll"), a rotational movement ω(Y) about the transverse axis Y (referred to as "pitch"), and a rotational movement ω(Z) about the vertical axis Z (referred to as "yaw"). The IMU 10 may, for example, comprise of but is not limited to at least one accelerometer 11 and at least one gyroscope 12. The inertial motion signal SIMU comprises but is not limited to a lateral acceleration signal SIMU1 which is output to the powertrain controller 3. It will be understood that the powertrain controller 3 may determine the lateral acceleration of the vehicle 1 from other sources, for example based on modelling techniques utilising data from other sensors.

The powertrain controller 3 is configured to receive a torque request signal STQR comprising the total requested torque TQR. The torque request signal STQR is generated in dependence on actuation of a brake pedal 13 and a throttle pedal 14. Alternatively, or in addition, the torque request signal STQR may be generated by vehicle control systems, such as an adaptive cruise control (ACC) system or a vehicle stability control (VSC) system. The torque request signal STQR represents the total torque to be transmitted to the front and rear axles 4, 5. The torque request signal STQR may comprise of but is not limited to a positive (+ve) torque request or a negative (−ve) torque request. The powertrain controller 3 monitors the torque request signal STQR to identify a torque change ΔTQR from a positive (+ve) torque request to a negative (−ve) torque request. Alternatively, or in addition, the powertrain controller 3 monitors the torque request signal STQR to identify a torque change ΔTQR from a neutral torque request (i.e. zero torque request) to a negative (−ve) torque request. Alternatively, or in addition, the powertrain controller 3 may monitors the torque request signal STQR to identify a torque change ΔTQR representing an increase in the magnitude of a negative (−ve) torque request. A negative torque request may be generated in dependence on a braking request, for example when the brake pedal 13 is depressed. Alternatively, or in addition, a negative torque request may be an overrun torque (or a drag torque) generated when a driver lifts of the throttle pedal 14 (thereby removing an acceleration request for the vehicle 1). The position of the brake pedal 13 and the throttle pedal 14 may be determined by a brake pedal position sensor 15 and a throttle pedal position sensor 16. The negative torque request may represent an opportunity to regenerate energy, for example to recharge an energy storage device (not shown), such as a traction battery. The first and second electric motors 6, 7 are controlled to generate the overrun torque to provide a vehicle response consistent with an expected vehicle behaviour. In particular, the overrun torque is applied to correspond to an engine torque generated by an internal combustion engine in the absence of a positive torque request.

The powertrain controller 3 comprises but is not limited to a stability control system (SCS) 17 configured selectively to activate a stability margin function. The SCS 17 monitors a plurality of vehicle dynamics parameters VDPn to determine if the vehicle 1 is operating inside or outside predefined vehicle stability margins VSMn. The vehicle dynamics parameters VDPn in the present embodiment comprise but are not limited to one or more of the following: the longitudinal acceleration A(X), the lateral acceleration A(Y), the vertical acceleration A(Z), the rotational movement ω(X) about the longitudinal axis X, the rotational movement ω(Y) about the transverse axis Y, and the rotational movement ω(Z) about the vertical axis Z. The vehicle dynamics parameters VDPn may also include one or more of the following: a powertrain torque request, a braking torque request, one or more wheel speed signal, and one or more wheel slip signal. The SCS 17 analyses the vehicle dynamics parameters VDPn to generate one or more of the following: an over-braking index OVBIN; a dynamic traction control (DTC) stability index DCTIN; and a yaw stability index YAWIN. The vehicle dynamics parameters VDPn are described below in more detail.

The over-braking index OVBIN is an on-brake stability indicator received from an antilock brake system (ABS) 18 and comprises but is not limited to separate indicators for the front and rear axles 4, 5. The over-braking index OVBIN is based on activity of the ABS 18. A value of zero (0) indicates a no slip condition, and a value of one (1) indicates that the ABS 18 is active for that axle 4, 5. An over-braking index OVBIN equal to one (1) indicates that the axle 4, 5 is unstable. Intermediate values (i.e. values between zero (0) and one (1)) indicate that the axle 4, 5 is becoming unstable. The over-braking index OVBIN is determined in dependence on wheel slip on each axle 4, 5 where a reference speed VREF of the vehicle 1 differs from wheel speed. The over-braking index OVBIN is defined for the front axle 4 (a front axle over-braking index OVBINFA) and the rear axle 4 (a rear axle over-braking index OVBINRA).

The DTC stability index DCTIN is an off-brake and on-brake stability indicator received from a DTC 19 and comprises but is not limited to separate indicators for the front and rear axles 4, 5. The DTC stability index DCTIN is based on activity of the DTC 19. A value of zero (0) indicates a no slip condition, and a value of one (1) indicates that the DTC 19 is active for that axle 4, 5. A DTC stability index DCTIN equal to one (1) indicates that the axle 4, 5 is unstable. Intermediate values (i.e. values between zero (0) and one (1)) indicate that the axle 4, 5 is becoming unstable. The DTC stability index DCTIN is determined in dependence on wheel slip on each axle 4, 5 where a reference speed VREF of the vehicle 1 differs from wheel speed. The DTC stability index DCTIN is defined for the front axle 4 (a front axle DTC stability index DCTINFA) and the rear axle 4 (a rear axle DTC stability index DCTINRA).

The yaw stability index YAWIN is a yaw-based stability indicator received from a vehicle dynamics controller (VDC) 20 and comprises but is not limited to separate indicators for the front and rear axles 4, 5. A value of zero (0) indicates a no yaw deviation condition, and a value of one (1) indicates that oversteer or understeer control is active for that axle 4, 5. A yaw stability index YAWIN equal to one (1) indicates that the axle 4, 5 is unstable. Intermediate values (i.e. values between zero (0) and one (1)) indicate that the axle 4, 5 is approaching VDC 20 intervention thresholds. The yaw stability index YAWIN is determined in dependence on a divergence of a measured yaw rate from a target yaw rate. The yaw stability index YAWIN is defined for the front axle 4 (a front axle yaw stability index YAWINFA) and the rear axle 4 (a rear axle yaw stability index YAWINRA).

In dependence on the analysis of the vehicle dynamics parameters VDPn, the powertrain controller 3 determines maximum and minimum rear bias limits (RearBiasMAX, RearBiasMIN) which define the distribution of torque to the rear axle 5 of the vehicle 1. The maximum and minimum rear bias limits RearBiasMAX, RearBiasMIN may, for example, control a proportion of a total requested negative torque (i.e. a braking torque) delivered at the rear axle 5. The maximum and minimum rear bias limits are defined to control the stability of the vehicle 1 by adjusting the powertrain-torque distribution between the front and rear axles 4, 5, rather than the total torque. The maximum and minimum rear bias limits (RearBiasMAX, RearBiasMIN) are output to determine a torque split operating window which is deemed stable by the SCS 17. The maximum and minimum rear bias limits (RearBiasMAX, RearBiasMIN) may determine a band of operation, or may converge on the same value to determine an absolute torque-split which is output by the SCS 17. If the vehicle dynamics parameters VDPn are determined to be outside the predefined vehicle stability margins VSMn, the maximum and minimum rear bias limits (RearBiasMAX, RearBiasMIN) converge on a stable torque-split window. The maximum and minimum rear bias limits (RearBiasMAX, RearBiasMIN) are followed under normal operating conditions, but there may be exceptions. For example, the maximum and minimum rear bias limits (RearBiasMAX, RearBiasMIN) may not be followed if there is a fault with one of the electric motors 6, 7 or if one of the electric motors 6, 7 is de-rated (for example, to avoid overheating).

The SCS 17 selectively activates and deactivates a stability margin function in dependence on the predefined vehicle stability margins VSMn. The stability margin function is activated when the vehicle 1 is operating outside the predefined vehicle stability margins VSMn. In the present embodiment, the stability margin function is activated when one or more of the over-braking index OVBIN; the dynamic traction control (DTC) stability index DCTIN; and the yaw stability index YAWIN are equal to one (1). The stability margin function is inactive (or is deactivated) when the vehicle 1 is operating within the predefined vehicle stability margins VSMn. In the present embodiment, the stability margin function is inactive (or is deactivated) when each of the over-braking index OVBIN; the dynamic traction control (DTC) stability index DCTIN; and the yaw stability index YAWIN is less than one (1). When the vehicle 1 is operating outside the predefined vehicle stability margins VSMn, the dynamic behaviour of the vehicle 1 in response to changes in the torque request is dependent on a surface grip level (defined as a coefficient of friction $\mu$ (mu)) and a powertrain-torque distribution between the front and rear axles 4, 5. The dynamic behaviour of the vehicle 1 is particularly affected by changes from a positive torque request to a negative torque request. If the powertrain-torque distribution is fixed, a change from a positive torque request to a negative torque request when the stability margin function is active may result in either an understeer condition or an oversteer condition depending on the surface grip level. In particular, if the vehicle 1 is travelling on a surface having a low surface grip level and the front/rear torque distribution is fixed, a change from a positive torque request to a negative torque request may result in an understeer condition for the vehicle 1. Conversely, if the vehicle 1 is travelling on a surface having a high surface grip level and the front/rear torque distribution is fixed, a change from a positive torque request to a negative torque request may result in an oversteer condition for the vehicle 1.

One approach to provide a consistent vehicle response, would be to define the stability margins below a tyre adhesion point, thereby restricting or limiting the use of the electric motors to generate a powertrain torque during overrun and/or braking events. As these stability margins are linked to the torque distribution ratio, the stability margins are triggered early to improve vehicle response on high and low surface grip level (mu), thereby reducing the occurrences of torque transfer between the front and rear axles 4, 5 during higher lateral acceleration A(Y). However, this reduces the opportunities for energy recuperation and potentially provides a non-optimal torque distribution between the front and rear axles 4, 5 for high and low mu surfaces.

The powertrain controller 3 in accordance with the present invention defines a first torque distribution profile TDP1 and at least a second torque distribution profile TDP2 for controlling the torque distribution between the front and rear axles 4, 5. The first torque distribution profile TDP1 defines a first torque split ratio defining the distribution of torque between the front and rear axles 4, 5. The second torque distribution profile TDP2 defines a second torque split ratio defining the distribution of torque between the front and rear axles 4, 5. The first torque distribution profile TDP1 is implemented by a base chassis system 21, for example. The first torque distribution profile TDP1 is a base (default) torque split and is active when the vehicle 1 is operating inside the predefined vehicle stability margins VSMn. The second torque distribution profile TDP2 is a modified torque split and is implemented when the vehicle 1 is operating outside the predefined vehicle stability margins VSMn. The second torque distribution profile TDP2 in the present embodiment is implemented by the SCS 17. In a variant, the functions of the SCS 17 and the base chassis system 21 may be combined. The SCS 17 is prioritised over the base chassis system 21. The stability margin function is active when the vehicle 1 is operating outside the predefined vehicle stability margins VSMn and the second torque distribution profile TDP2 takes precedence over the first torque distribution profile TDP1 implemented by the base chassis system 21. Thus, the first torque distribution profile TDP1 is operative when the stability margin function is not active; and the second torque distribution profile TDP2 is implemented when the stability margin function is active. It will be understood that in a variant the powertrain controller 3 could be configured to select either the first torque distribution profile TDP1 or the second torque distribution profile TDP2.

In the present embodiment, assuming there is no +ve drive torque request from the driver, the first torque distribution profile TDP1 defines a first fixed torque split between the front and rear axles 4, 5. By way of example, the first torque distribution profile TDP1 in the present embodiment defines a torque split ratio of 70/30 (Front/Rear) between the front axle 4 and the rear axle 5. The second torque distribution profile TDP2 is configured to take account of an available surface grip level (defined as a coefficient of friction $\mu$ (mu)). The second torque distribution profile TDP2 defines a dynamic torque distribution between the front and rear axles 4, 5. In the present embodiment, the torque distribution defined by the second torque distribution profile TDP2 is controlled in dependence on the available surface grip level. The powertrain controller 3 in the present embodiment makes a determination of the surface grip level in dependence on the lateral acceleration A(Y) of the vehicle 1. A high lateral acceleration A(Y) when the stability margin function is active is indicative of a high surface grip level (i.e. a high mu surface). Conversely, a low lateral acceleration A(Y) when the stability margin function is active is indicative of a low surface grip level (i.e. a low mu surface). By measuring the lateral acceleration A(Y), a determination is made as to the surface grip level.

Figure 3:
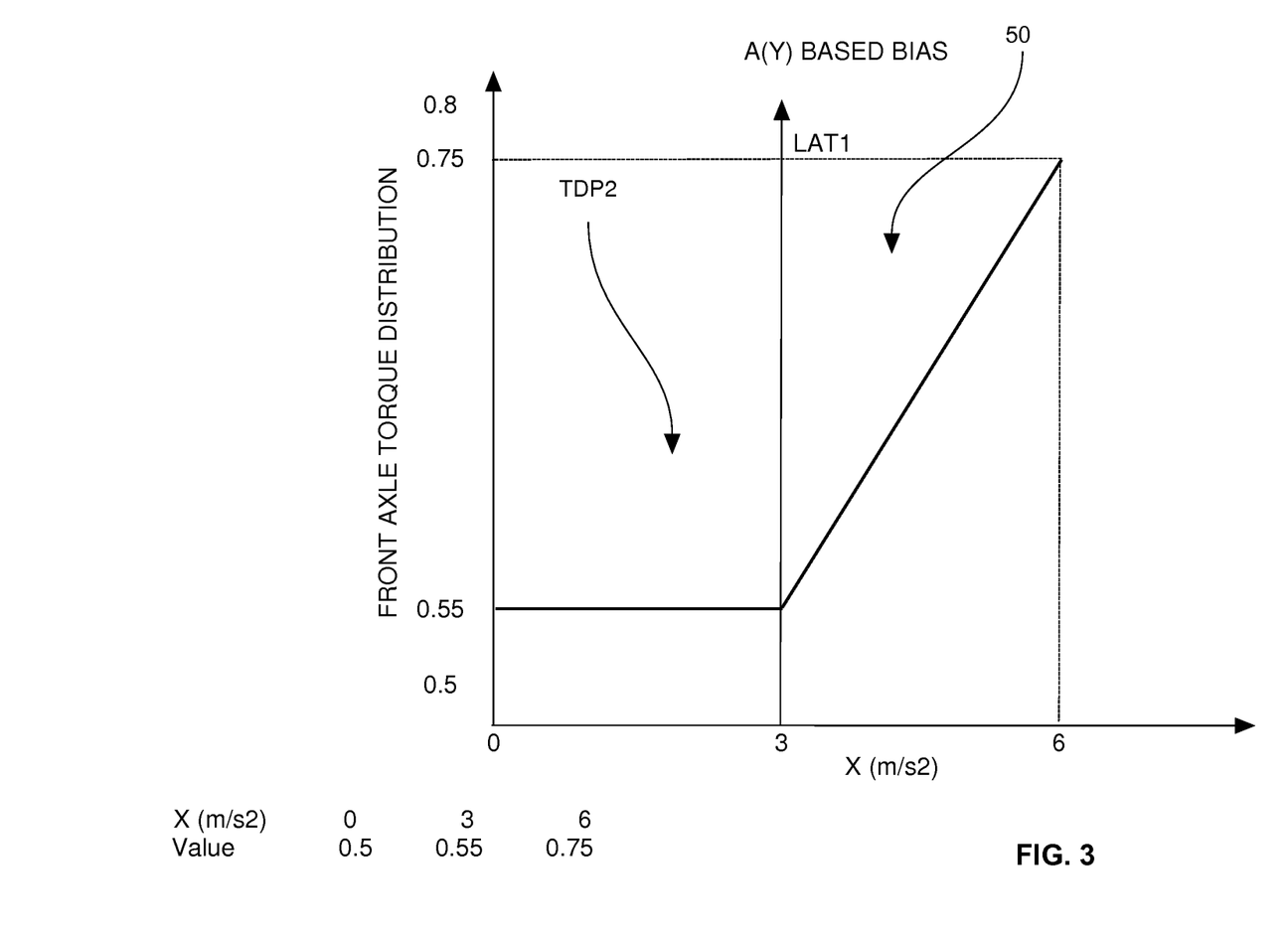
FIG. 3 shows a first graph representing the torque distribution profile to be implemented by the powertrain controller.

The second torque distribution profile TDP2 is illustrated in a first graph 50 shown in FIG. 3. The first graph 50 shows the proportion of the total requested torque distributed to the front axle 4 of the vehicle 1 against the measured lateral acceleration A(Y). (The torque distributed to the rear axle 5 is calculated by subtracting the proportion distributed to the front axle 4 from one.) The second torque distribution profile TDP2 is implemented when the SCS 17 detects a torque change ΔTQR from a positive (+ve) torque request to a negative (−ve) torque request. The transition from a positive (+ve) torque request to a negative (−ve) torque request may, for example, indicate overrun torque caused by the driver of the vehicle 1 lifting off the throttle pedal 14. The second torque distribution profile TDP2 defines a lateral acceleration threshold LAT1. In the present embodiment, the lateral acceleration threshold LAT1 is defined as 3 m/s², as shown in FIG. 3. In the present embodiment, the second torque distribution profile TDP2 defines a second fixed torque split ratio when the measured lateral acceleration A(Y) is less than the lateral acceleration threshold. The second fixed torque split ratio is different from the first fixed torque split ratio defined by the first torque distribution profile TDP1 in the present embodiment. When the measured lateral acceleration A(Y) is greater than the lateral acceleration threshold, the second torque distribution profile TDP2 defines a variable torque split ratio. The lateral acceleration threshold LAT1 is defined to provide the desired dynamic behaviour of the vehicle 1 in dependence on changes in the torque request when the stability margin function is active. The lateral acceleration threshold LAT1 could be calibrated for a particular vehicle type or class of vehicle.

When the measured lateral acceleration A(Y) of the vehicle 1 is less than the lateral acceleration threshold LAT1, the powertrain controller 3 determines that the surface grip level (mu) of the vehicle 1 is low. In this scenario, the second torque distribution profile TDP2 prioritizes a balance of torque between the front axle 4 and the rear axle 5. The proportion of the total requested torque distributed to the front axle 4 is decreased (relative to the torque split ratio defined by the first torque distribution profile TDP1); and the proportion of the total requested torque distributed to the rear axle 5 is increased (relative to the torque split ratio defined by the first torque distribution profile TDP1). The second torque distribution profile TDP2 may, for example, prioritize the balance of overrun torque between the front axle 4 and the rear axle 5 resulting in a proportional split which is less than the first torque distribution profile TDP1 implemented by the base chassis system 21. The resulting torque split ratio between the front axle 4 and the rear axle 5 is closer to a 50/50 (Front/Rear) distribution than the torque split ratio defined by the first torque distribution profile TDP1. The first graph 50 shows a torque split ratio of approximately 55/45 (Front/Rear) when the measured lateral acceleration is less than the lateral acceleration threshold LAT1. In a variant, a torque distribution of 60/40 (Front/Rear) may be applied when the measured lateral acceleration is less than the lateral acceleration threshold LAT1.

When the measured lateral acceleration A(Y) of the vehicle 1 is greater than the lateral acceleration threshold LAT1, the powertrain controller 3 determines that the surface grip level (mu) of the vehicle 1 is high. In this scenario, the second torque distribution profile TDP2 prioritizes the torque distributed to the front axle 4 over the torque distributed to the rear axle 5. The proportion of the total requested torque distributed to the front axle 4 is increased (relative to the torque split ratio defined by the second torque distribution profile TDP2 for a measured lateral acceleration less than the lateral acceleration threshold LAT1); and the proportion of the total requested torque distributed to the rear axle 5 is decreased (relative to the torque split ratio defined by the second torque distribution profile TDP2 for a measured lateral acceleration less than the lateral acceleration threshold LAT1). In the present embodiment, when the measured lateral acceleration A(Y) is greater than the lateral acceleration threshold LAT1, the proportion of the total requested torque distributed to the front axle 4 increases in direct proportion to the measured lateral acceleration A(Y). The second torque distribution profile TDP2 may, for example, prioritize the distribution of the overrun torque onto the front axle 4 over the rear axle 5, resulting in a proportional split which is greater than the first torque distribution profile TDP1 implemented by the base chassis system 21. As shown in FIG. 3, the second torque distribution profile TDP2 defines a torque split ratio of approximately 55/45 (Front/Rear) when the measured lateral acceleration is equal to the lateral acceleration threshold LAT1 (i.e. the measured lateral acceleration is 3 m/s²). The second torque distribution profile TDP2 defines a torque split ratio of approximately 75/25 (Front/Rear) when the measured lateral acceleration is 6 m/s².

Figure 4:
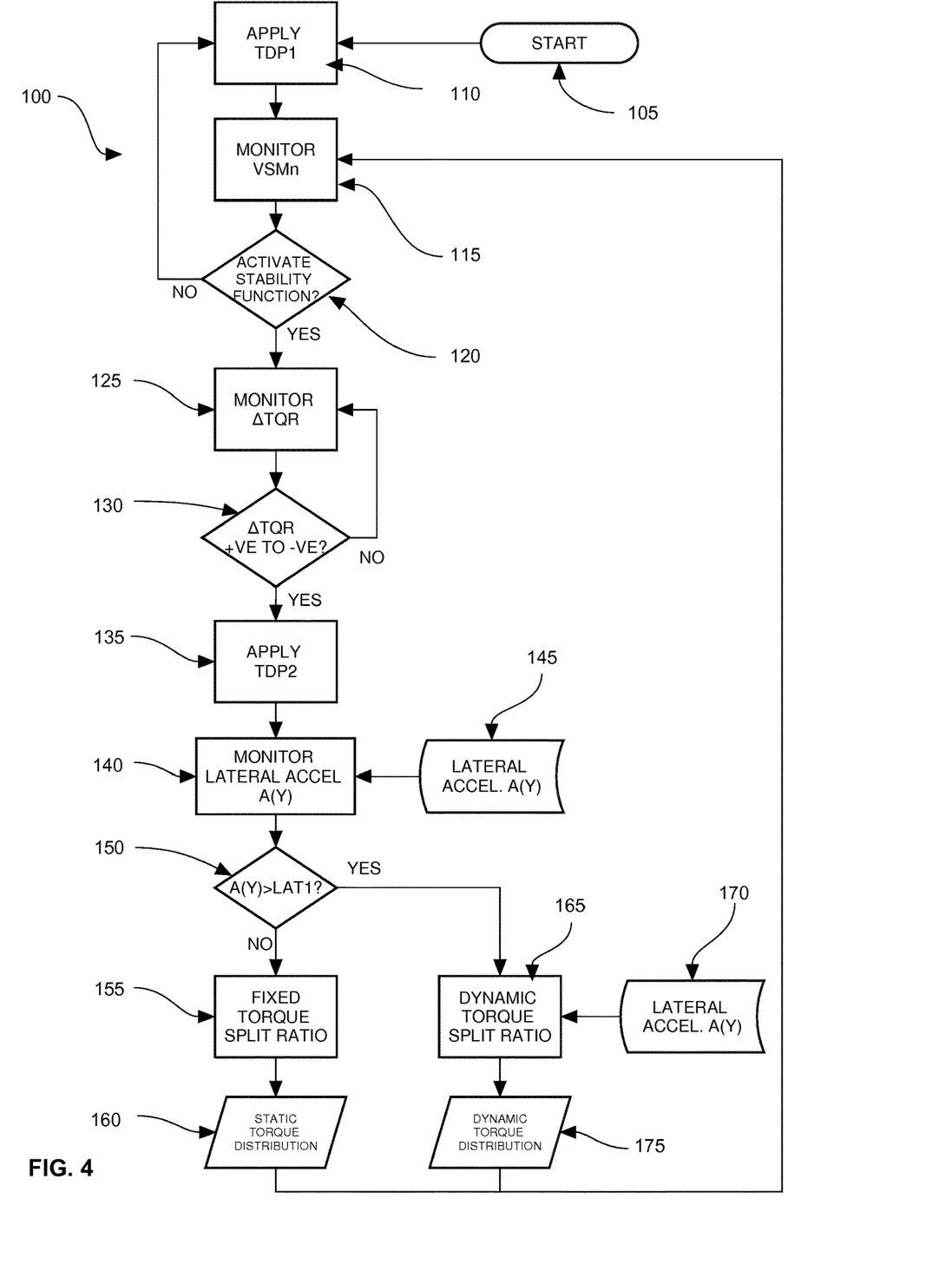
FIG. 4 shows a flow chart representing operation of the powertrain controller shown in FIG. 1.

The operation of the powertrain controller 3 will now be described with reference to a flow chart 100 shown in FIG. 4. The process is started (BLOCK 105) and the base chassis system 21 activates the first torque distribution profile TDP1 (BLOCK 110). The vehicle stability margins VSMn are monitored by the powertrain controller 3 (BLOCK 115). The SCS 17 controls activation of the stability control margin in dependence on the vehicle stability margins VSMn (BLOCK 120). The SCS 17 activates the stability margin function when the vehicle dynamics parameters VDPn are outside the vehicle stability margins VSMn. The stability margin function is not activated (or is deactivated) when the vehicle dynamics parameter VDPn are within the vehicle stability margins VSMn. If the stability margin function is not activated, the first torque distribution profile TDP1 remains active and the vehicle stability margins VSMn are monitored (BLOCK 115). If the stability margin function is activated, the powertrain controller 3 monitors a change ΔTQR in the requested torque TQR (BLOCK 125). The powertrain controller 3 is configured to determine if the change ΔTQR is from a positive (+ve) torque request TQR to a negative (−ve) torque request TQR (BLOCK 130). If the change ΔTQR is not from a positive (+ve) torque request TQR to a negative (−ve) torque request TQR, the powertrain controller 3 continues to monitor the requested torque TQR to identify changes TQR (BLOCK 125). If the change ΔTQR is from a positive (+ve) torque request TQR to a negative (−ve) torque request TQR, the powertrain controller 3 activates the second torque distribution profile TDP2 (BLOCK 135). The lateral acceleration A(Y) of the vehicle 1 is monitored (BLOCK 140) in dependence on the lateral acceleration signal SIMU1 received from the IMU 10 (BLOCK 145). The powertrain controller 3 compares the measured lateral acceleration A(Y) to the lateral acceleration threshold LAT1 (BLOCK 150). If the measured lateral acceleration A(Y) is less than the lateral acceleration threshold LAT1, a fixed torque split ratio is defined (BLOCK 155). The fixed torque split ratio is output to control the first and second electric motors 6, 7 to distribute the torque between the front and rear axles 4, 5 (BLOCK 160). The powertrain controller 3 continues to monitor the vehicle stability margins VSMn (BLOCK 115). If the measured lateral acceleration A(Y) is greater than the lateral acceleration threshold LAT1, a dynamic torque split ratio is determined (BLOCK 165). The dynamic torque split ratio is determined in dependence on the lateral acceleration signal SIMU1 received from the IMU 10 (BLOCK 170). The dynamic torque split ratio is output to control the first and second electric motors 6, 7 to distribute the torque between the front and rear axles 4, 5 (BLOCK 175). The powertrain controller 3 continues to monitor the vehicle stability margins VSMn (BLOCK 115).

The second torque distribution profile TDP2 may reduce the level of priority given to the front axle 4 for regenerative purposes in proportion to the lateral acceleration A(Y) of the vehicle 1. This may reduce the added understeer moment generated by prioritizing the front axle 4 on a low friction surface or lift-off oversteer generated by having more regenerative torque on the rear axle 5 on a high friction surface at high lateral acceleration. It will be understood that the second torque distribution profile TDP2 may be tunable for different traction modes and/or driver-configurable regeneration modes.

The second torque distribution profile TDP2 has been described herein with reference to the first graph 50. It will be understood that the second torque distribution profile TDP2 may be defined by a look-up table. For example, the torque split ratio may be determined by accessing an entry in the look-up table in dependence on the measured lateral acceleration A(Y). Alternatively, or in addition, an equation may be used to define the relationship between the torque split ratio and the measured lateral acceleration A(Y).

The second torque distribution profile TDP2 may be non-uniform below the lateral acceleration threshold LAT1. For example, the torque split ratio may increase in proportion to the measured lateral acceleration A(Y). A first relationship between the torque distribution and the lateral acceleration A(Y) may be defined below the lateral acceleration threshold LAT1; and a second relationship between the torque distribution and the lateral acceleration A(Y) may be defined above the lateral acceleration threshold LAT1. The torque split ratio may have a first gradient when the measured lateral acceleration A(Y) is less than the lateral acceleration threshold LAT1; and a second gradient when the measured lateral acceleration A(Y) is greater than the lateral acceleration threshold LAT1.

Figure 5:
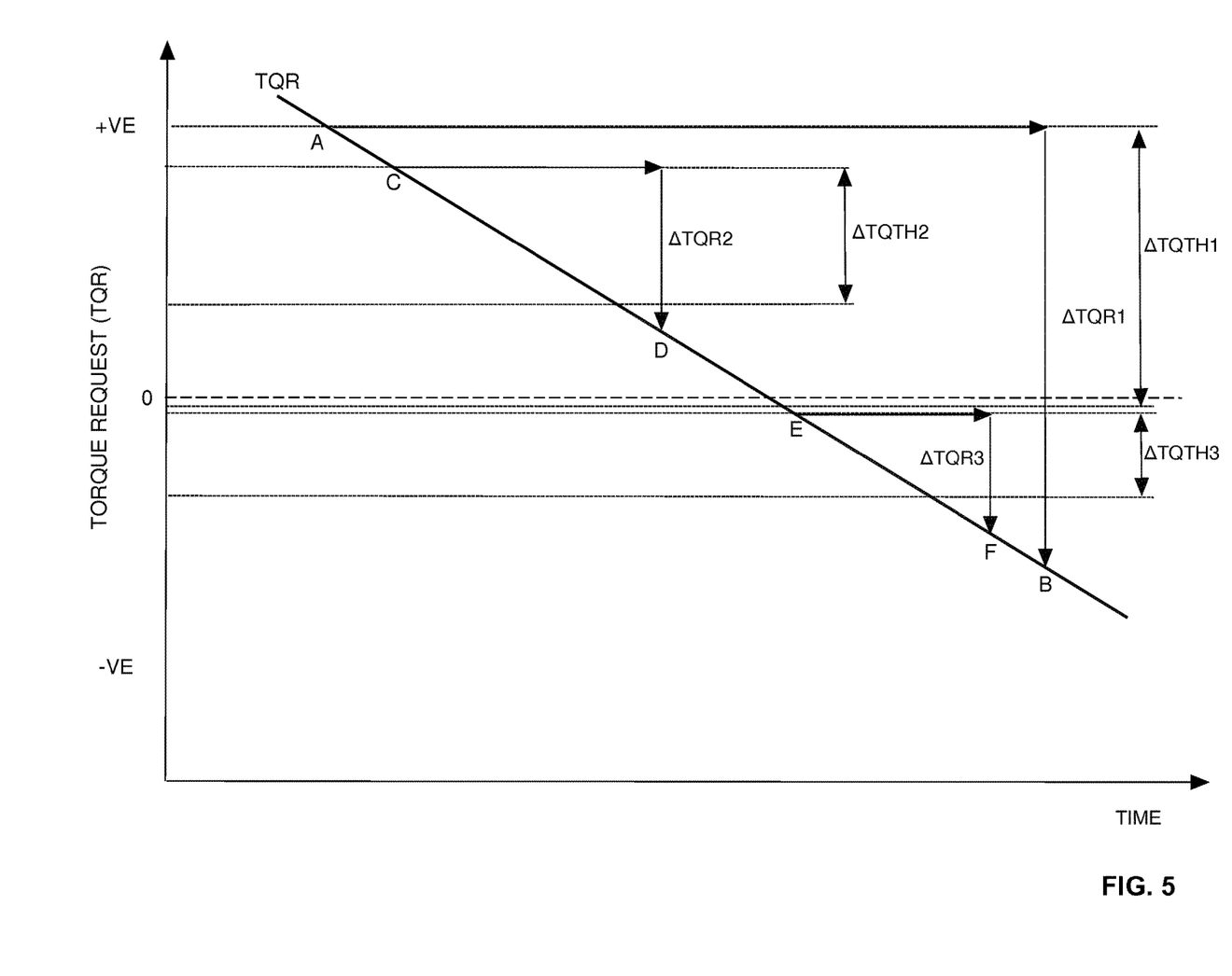
FIG. 5 shows a graph representing changes in the requested torque.

The powertrain controller 3 has been described herein as monitoring the torque request signal STQR to identify a torque change ΔTQR from a positive (+ve) torque request to a negative (−ve) torque request. A first torque change ΔTQR1 from a positive (+ve) torque request to a negative (−ve) torque request is represented by line AB in FIG. 5. In a variant, the powertrain controller 3 may monitor the torque request signal STQR to identify a torque change ΔTQR which may influence stability of the vehicle 1. The powertrain controller 3 may, for example, monitor the torque request signal STQR to identify a torque change ΔTQR which exceeds a first torque change threshold ΔTQTH1. The torque change ΔTQR may comprise a reduction in a magnitude of a positive (+ve) torque request. A second torque change ΔTQR2 representing a reduction in a positive (+ve) torque request is represented by line CD in FIG. 5. The powertrain controller 3 may, for example, monitor the torque request signal STQR to identify a torque change ΔTQR which exceeds a second torque change threshold ΔTQTH2. The torque change ΔTQR may comprise an increase in a magnitude of a negative (−ve) torque request. A third torque change ΔTQR3 representing an increase in a negative (+ve) torque request is represented by line EF in FIG. 5. The powertrain controller 3 may, for example, monitor the torque request signal STQR to identify a torque change ΔTQR which exceeds a third torque change threshold ΔTQTH3. The first, second and third torque change threshold ΔTQTH1-3 may be predefined. The first, second and third torque change threshold ΔTQTH1-3 may be the same as each other. Alternatively, one or more of the first, second and third torque change threshold ΔTQTH1-3 may be different. For example, the second torque change threshold ΔTQTH2 may be greater than the first torque change threshold ΔTQTH1 (i.e. ΔTQTH2>ΔTQTH1). The third torque change threshold ΔTQTH3 may be less than the first torque change threshold ΔTQTH1 (i.e. ΔTQTH3<ΔTQTH1).

Alternatively, or in addition, the powertrain controller 3 may determine a rate of change of the torque request (dTQR/dt). The powertrain controller 3 may compare the determined rate of change of the torque request (dTQR/dt) with a predefined rate of change threshold. The second torque distribution profile TDP2 may be implemented when the determined rate of change of the torque request (dTQR/dt) is greater than a predefined rate of change threshold.

It will be appreciated that various modifications may be made to the embodiment(s) described herein without departing from the scope of the appended claims.

The invention claimed is:

1. A powertrain controller for controlling a torque distribution between a front axle and a rear axle of a vehicle, the powertrain controller comprising a processor and a memory device, the processor being configured selectively to implement first and second torque distribution profiles (TDP1, TDP2) defining the torque distribution between the front axle and the rear axle wherein the processor is configured to:
   determine when one or more vehicle dynamics parameter (VDPn) is within one or more predefined stability margin (VSMn) and when the one or more vehicle dynamics parameter (VDPn) is outside the one or more predefined stability margin (VSMn);
   monitor a torque request signal (STQR) to identify a change in a torque request (TQR);
   implement the first torque distribution profile (TDP1) when the one or more vehicle dynamics parameter (VDPn) is within the one or more predefined stability margin (VSMn); and
   implement the second torque distribution profile (TDP2) when the one or more vehicle dynamics parameter (VDPn) is outside the one or more predefined stability margin (VSMn) and the identified change in the torque request (TQR) comprises a decrease in the torque request (TQR), wherein the powertrain controller is configured to determine a lateral acceleration of the vehicle, and wherein the second torque distribution profile (TDP2) comprises a lateral acceleration threshold (LAT1).

2. The powertrain controller as claimed in claim 1, wherein the processor is configured to implement the second torque distribution profile (TDP2) when a magnitude of the decrease in the torque request (TQR) is greater than a predefined torque change threshold (ΔTQTH).

3. The powertrain controller as claimed in claim 1, wherein the processor is configured to implement the second torque distribution profile (TDP2) when the decrease in the torque request (TQR) comprises a change from a positive (+ve) torque request (TQR) to a negative (−ve) torque request (TQR).

4. The powertrain controller as claimed in claim 1, wherein the second torque distribution profile (TDP2) controls the torque distribution between the front axle and the rear axle based at least in part on the determined lateral acceleration of the vehicle.

5. The powertrain controller as claimed in claim 4, wherein the second torque distribution profile (TDP2)

increases the torque distributed to the front axle based at least in part on the determined lateral acceleration of the vehicle.

6. The powertrain controller as claimed in claim 5, wherein the second torque distribution profile (TDP2) controls the torque distributed to the front axle in direct proportion to the determined lateral acceleration.

7. The powertrain controller as claimed in claim 4, wherein the second torque distribution profile (TDP2) controls the torque distributed to the rear axle based at least in part on the determined lateral acceleration of the vehicle.

8. The powertrain controller as claimed in claim 7, wherein the second torque distribution profile (TDP2) decreases the torque distributed to the rear axle in direct proportion to the determined lateral acceleration.

9. The powertrain controller as claimed in claim 1, wherein the control of the torque distribution between the front axle and the rear axle based at least in part on the determined lateral acceleration of the vehicle is implemented when the lateral acceleration of the vehicle is greater than the lateral acceleration threshold (LAT1).

10. The powertrain controller as claimed in claim 1, wherein the decrease in the torque request (TQR) corresponds to an overrun torque.

11. The powertrain controller as claimed in claim 1, wherein the decrease in the torque request (TQR) corresponds to a braking event.

12. A vehicle comprising The powertrain controller as claimed in claim 1.

13. A method of controlling a torque distribution between a front axle and a rear axle of a vehicle by selectively implementing at least first and second torque distribution profiles (TDP1, TDP2), the first and second torque distribution profiles (TDP1, TDP2) defining the torque distribution between the front axle and the rear axle; wherein the method comprises:

determining when one or more vehicle dynamics parameter (VDPn) is within one or more predefined stability margin (VSMn) and when the one or more vehicle dynamics parameter (VDPn) is outside the one or more predefined stability margin (VSMn);

monitoring a torque request (TQR) to identify a change in the torque request (TQR);

implementing the first torque distribution profile (TDP1) when the one or more vehicle dynamics parameter (VDPn) is within the one or more predefined stability margin (VSMn); and implementing the second torque distribution profile (TDP2) when the one or more vehicle dynamics parameter (VDPn) is outside the one or more predefined stability margin (VSMn) and the identified change in the torque request (TQR) comprises a decrease in the torque request (TQR); and determining a lateral acceleration of the vehicle, wherein the second torque distribution profile (TDP2) comprises a lateral acceleration threshold.

14. A non-transitory computer-readable medium having a set of instructions stored therein which, when executed, cause a processor to perform the method claim 13.

15. The powertrain controller as claimed in claim 1, wherein the processor is configured to implement the second torque distribution profile (TDP2) when a rate of change of the torque request (TQR) is greater than a predefined rate of change.

16. The powertrain controller as claimed in claim 1, wherein the processor is configured to implement the second torque distribution profile (TDP2) when the decrease in the torque request (TQR) comprises a change from a substantially neutral torque request (TQR) to a negative (−ve) torque request (TQR).

17. The powertrain controller as claimed in claim 1, wherein the processor is configured to implement the second torque distribution profile (TDP2) when the decrease in the torque request (TQR) comprises an increase in a magnitude of a negative (−ve) torque request (TQR).

18. A vehicle as claimed in claim 12, the vehicle comprising at least one electric traction motor.

* * * * *